Dec. 29, 1970  A. X. WIDMER  3,551,800
TEST APPARATUS FOR ANALYZING THE PERFORMANCE
CHARACTERISTICS OF INTERNAL COMBUSTION
ENGINE IGNITION SYSTEMS
Filed June 6, 1968  3 Sheets-Sheet 3

United States Patent Office 3,551,800
Patented Dec. 29, 1970

3,551,800
TEST APPARATUS FOR ANALYZING THE PERFORMANCE CHARACTERISTICS OF INTERNAL COMBUSTION ENGINE IGNITION SYSTEMS
Albert X. Widmer, Katonah, N.Y., assignor to International Business Machines Corporation, Armonk, N.Y., a corporation of New York
Filed June 6, 1968, Ser. No. 735,136
Int. Cl. G01m 15/00
U.S. Cl. 324—15                                4 Claims

ABSTRACT OF THE DISCLOSURE

A system of test apparatus for analyzing the performance of the ignition system of an internal combustion engine is provided. The apparatus is connected to appropriate elements of the internal combustion engine's ignition system and provides data which indicates whether the ignition system is functioning properly. One element of the test system is a pulse generator which provides a pulse which emulates the pulse usually obtained from the secondary of the ignition coil. The ignition coil is disconnected from the engine distributor and the pulse generator is used instead to provide a well-defined pulse to the distributor rotor. The output of the pulse generator may be controlled, for example, by a source of control signals to vary the pulse parameters. Another element of the test system is a "points open detector" which provides an indication of the exact time when the engine breaker points open. The "points open detector" employs a voltage level detector in combination with a timing device. Still another element of the test system is a "spark end detector." the "spark end detector" provides an indication of the time when the ignition spark discharge ends. The "spark end detector" includes the use of a current sensor connected to the aforesaid pulse generator. The output signals from the points open detector and the spark end detector may be transmitted to a data processing means for analysis.

BACKGROUND OF THE INVENTION

Field of the invention

The present invention is in the engine analyzer art and, more particularly, relates to systems for testing, analyzing and diagnosing the ignition characteristics of an internal combustion engine.

Description of the prior art

Prior art systems for analyzing ignition system characteristics involve the use of a cathode ray tube to display the voltage and current waveforms. The diagnosis is then made by the operator observing the displayed waveforms. Examples of prior art systems are provided in U.S. Patent 3,035,438, issued May 22, 1962 to R. B. Hale and U.S. Patent 3,186,218, issued June 1, 1965 to W. B. Hollis.

The system of the present invention is distinct in that an idealized ignition pulse is provided from a separate pulse generator and the characteristics of the ignition waveforms are determined as measurement signals which may be analyzed by computer data processing.

SUMMARY OF THE INVENTION

A system of test apparatus for providing data for analyzing and diagnosing the ignition elements of an internal combustion engine. The ignition pulse generating equipment of the engine consisting of the battery, breaker points, condenser and coil is disconnected from the distributor of the engine and an external pulse generator is provided which is connected to the distributor and generates a well-defined pulse for firing the engine spark plugs. The external pulse generator is synchronized with the engine timing device (i.e., breaker points). The external pulse generator may also be controlled to advance or retard the firing time if desired.

Apparatus is also provided for determining the "points open" time from the voltage waveform across the breaker points and for determining the end of the spark discharge waveform by detecting the current in the ground return path of the secondary coil of the external pulse generator.

An advantage of the present invention is that the external pulse generator provides a predetermined well-defined pulse so that any abnormalities detected in the resultant spark discharge waveform can be attributed to the distributor and spark plugs rather than being the result of abnormalities in the engine's battery, coil or condenser.

Another advantage of the present invention is the provision of apparatus for determining parameters of ignition waveforms which may be subsequently analyzed by data processing techniques.

Therefore, an object of the present invention is to provide test apparatus for the ignition system of an internal combustion engine.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Prior to a discussion of the operation of the test apparatus of the present invention, a brief discussion of ignition system waveforms will be provided.

The two ignition voltage patterns used for analysis are the primary circuit voltage and the secondary circuit voltage waveform. The primary circuit voltage and the secondary circuit voltage waveforms are shown in FIGS. 1 and 2 respectively.

Figure 1:
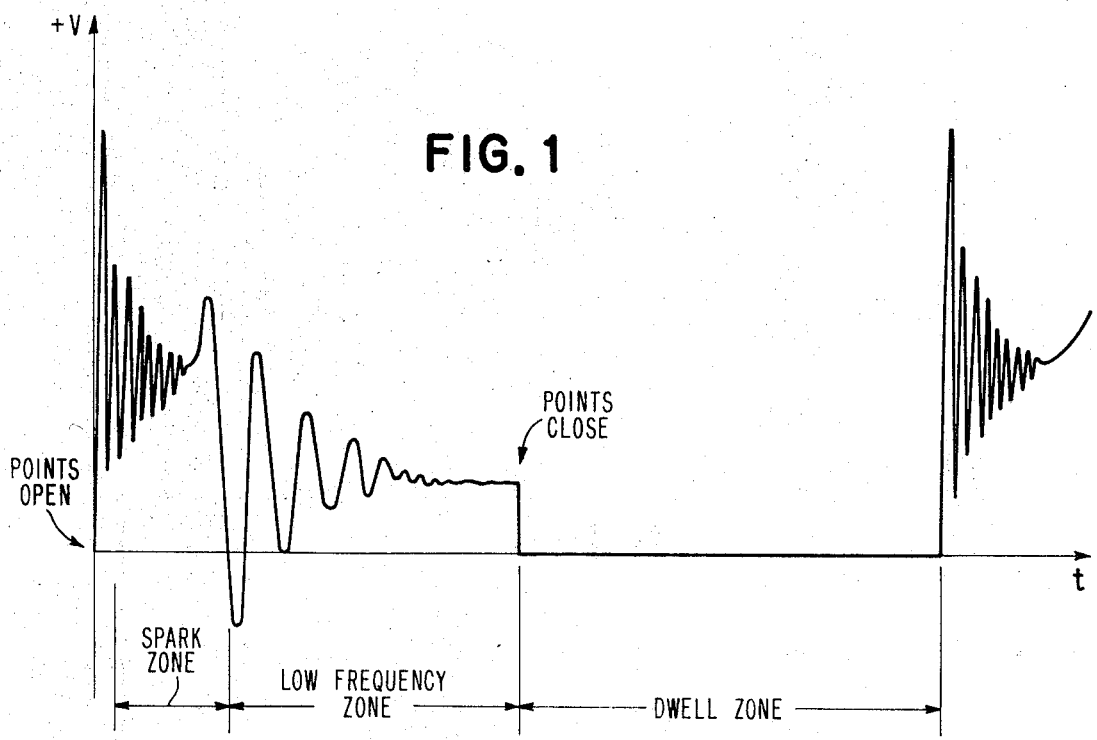
FIG. 1 is a curve representing the primary circuit voltage waveform of an ignition system.
Figure 2:
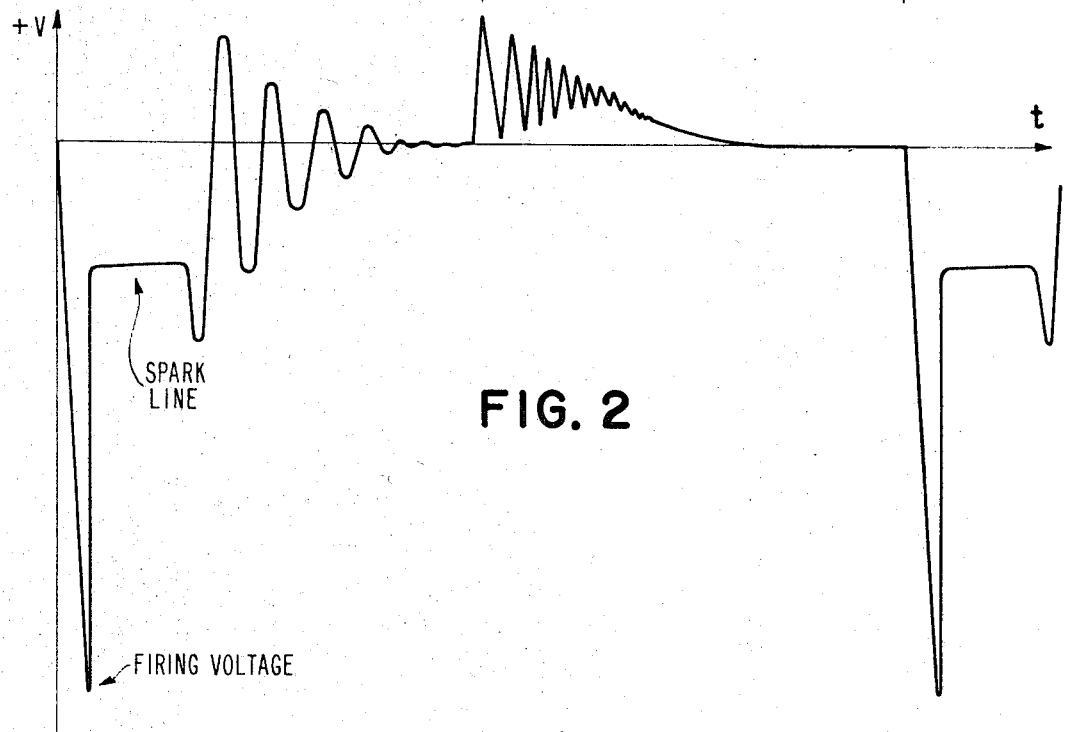
FIG. 2 is a curve representing the secondary voltage waveform of an ignition system.

In FIG. 1, the primary voltage waveform shows the voltage variation across the engine breaker points and in FIG. 2, the secondary voltage waveform shows the voltage variation across the spark plug. Since a properly operating ignition system presents characteristic patterns, any deviation from the characteristic patterns indicates some type of difficulty. The waveform patterns shown in FIGS. 1 and 2 are normal and represent a properly operating system.

The voltage waveforms can be generally divided into three sections: the spark zone, the low frequency zone, and the dwell zone. These three zones are designated in FIGS. 1 and 2. The spark zone begins the instant the breaker points open. The high negative voltage peak (the firing voltage) shown on the secondary waveform pattern of FIG. 2 at the beginning of the spark zone indicates the voltage surge in the secondary circuit to the spark plugs. When the potential has reached the firing potential, a spark across the plug is initiated. The much lower potential at which the spark is sustained is indicated by the height of the spark line. The firing voltage is generally in the order of 5 to 15 kilovolts and the spark line voltage is in the order of 1 kilovolt. The length of the spark line indicates how long the spark exists. The spark extinguishes at the end of the spark zone.

The low frequency zone immediately follows the spark zone and appears on the secondary waveform of FIG. 2 as a series of gradually diminishing oscillations. These oscillations are caused by the rapid transfer of energy from the coil inductance to the combined capacitance of the coil and the condenser. The energy begins as the energy remaining in the coil after the spark and is dissipated as it alternately is stored by the coil and capacitance, hence, the diminishing oscillations.

The dwell zone begins when the breaker points close and continues until the points open again. When the points close, a small high frequency oscillation begins in the secondary as a result of the battery voltage being applied across the primary winding.

The primary waveform pattern is divided into the same three sections. The spark zone of the primary voltage waveform in FIG. 1 differs from the spark zone of the secondary voltage waveform of FIG. 2 in that there are high frequency oscillations superimposed on the spark line. These oscillations result from the transfer of energy between the primary coil inductance and the condenser. The low frequency zone of the primary voltage waveform of FIG. 1 is similar to the secondary voltage waveform of FIG. 2 and can be interpreted in the same way as for FIG. 2. When these oscillations die out to a straight line, the line represents the DC voltage across the points which is nearly the same as the automotive battery voltage.

When the points close, the secondary waveform pattern of FIG. 1 shows the rapid change as the voltage across the point drops to zero. The dwell zone showing the length of time the points remain closed, continues up to the points open time indicating the start of another cycle.

Characteristics of the secondary waveform pattern are indicative of ignition abnormalities. For example, if a long low spark line is indicated, this may mean that there is a shorted or fouled plug, a shorted wire or a close gap. A short high spark line indicates either a spark plug with an excessive gap or gaps in the ignition wires or connections. When there is no spark line, it may mean that there is an open plug, an open wire or a defective distributor. A sharply decreasing spark line voltage indicates too much resistance in the wire.

In the present invention, two particular characteristics of the secondary voltage waveform are determined. One is the time at which the points open and the other is the time at which the spark ends. Unique test apparatus is provided to determine these parameters in cooperation with an external pulse generator which is substituted for the coil of the engine ignition system in order to provide an idealized input waveform.

Figure 3:
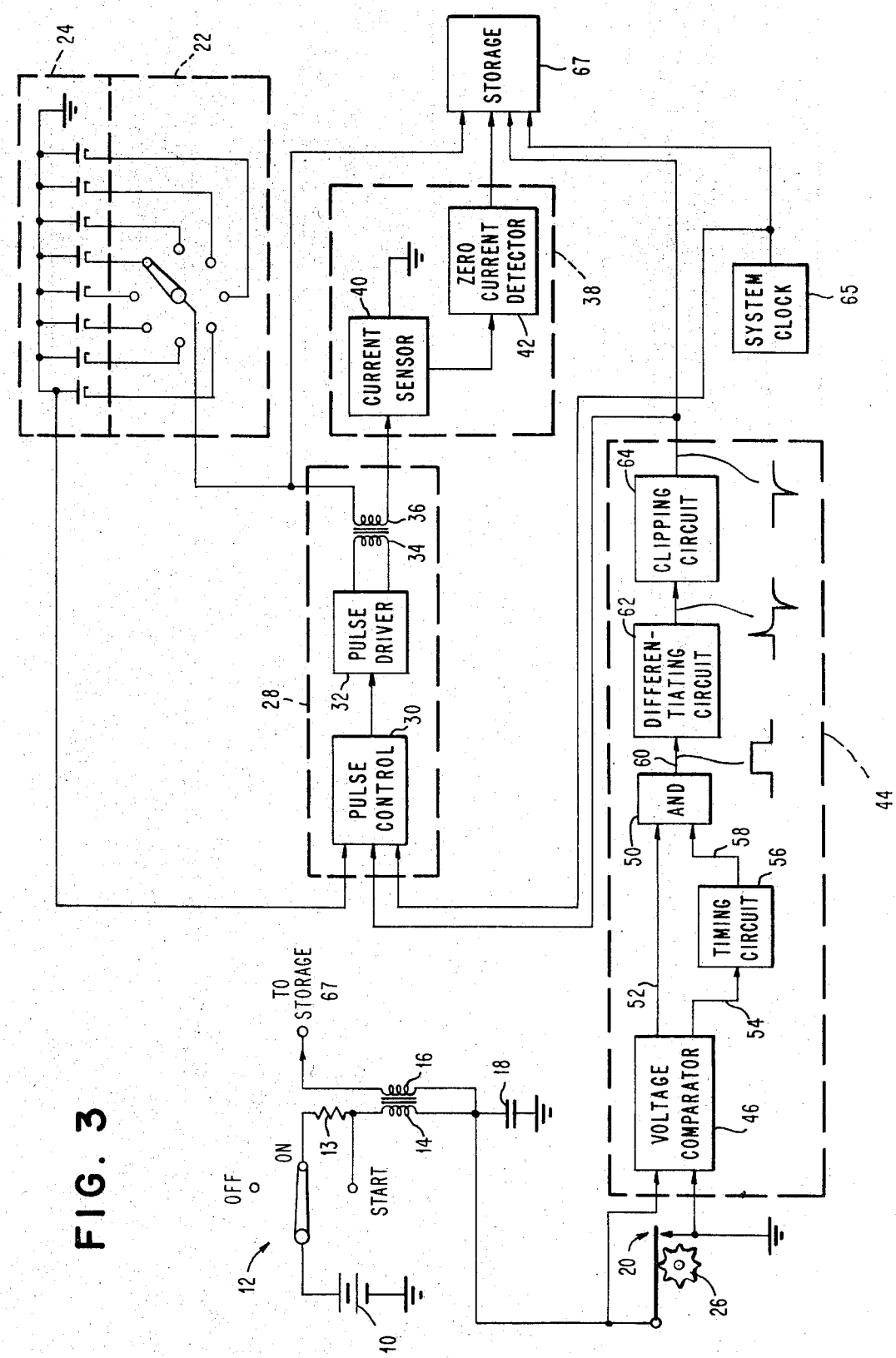
FIG. 3 is a system block diagram of an embodiment of test apparatus according to the principles of the present invention.

Referring to FIG. 3, the test apparatus is shown in combination with the engine ignition system. The engine ignition system consists of the battery 10, the ignition switch 12, the ballast resistor 13, the coil consisting of primary winding 14 and secondary winding 16, a condenser 18, a pair of breaker points 20, a distributor 22 and the spark plugs 24.

In a conventional ignition system, the battery 10 supplies current to the primary coil winding 14. When the breaker points 20 are closed and provide a path to ground, the current supports the storage of magnetic energy in the coil. When the breaker points are opened by a cam 26 driven by the engine shaft, the current is cut off and the energy stored in the magnetic field must dissipate. The energy dissipates by inducing a current in the secondary winding 16 of the coil which is normally connected to the distributor 22. Because there are about 100 times as many turns in the secondary winding 16 as in the primary winding 14, the transformer action steps up the primary voltage to produce a large secondary voltage in the secondary coil 16. This large voltage is enough to cause a spark to jump the spark plug gap. The condenser 18 provides a temporary path for the current the instant the breaker points open helping to prevent arcing of the points as they open, thereby reducing wear of the breaker points.

The distributor 22 selects which spark plug the spark potential goes to. The time during which the breaker points are closed is called dwell. This time should be long enough to allow a sufficient magnetic field buildup in the primary coil at high engine speeds. The dwell is adjusted by setting the proper gap between the points when they are opened.

Referring to FIG. 3, in the present invention the secondary coil windings 16 are disconnected from the distributor 22. Instead the distributor 22 is connected to the output of an external pulse generator 28 consisting of a pulse control 30, an external pulse generator driver 32, a primary coil winding 34 and a secondary coil winding 36. The external pulse generator 28 produces a voltage pulse which is connected to the distributor 22 in order to fire the spark plugs.

Another element of the test apparatus of the present invention is a spark end point detecting means 38 which is connected in the ground return path of the secondary coil winding 36 of the external pulser 28. The spark end point detector 38 includes a current sensor 40 and a zero current detector 42.

Still another element included in the test apparatus of FIG. 3 is a means for detecting the opening of the breaker points 20. The points open detector 44 is connected across the breaker points 20 and includes a voltage comparator 46, a timing circuit 48, and AND circuit 50, a differentiating circuit 54 and a clipping circuit 56.

What is shown in FIG. 3, therefore, is test apparatus for an internal combustion engine ignition system wherein the engine ignition coil is detached from the distributor and external pulse generator 28 is connected to the distributor in its place. Spark end detector 38 is connected in the ground return path of the external pulse generator 28 and points open detector means 44 is connected across the breaker points of the engine ignition system. A system clock 65 is provided to establish a time reference for the occurrence of the output pulse from external pulse generator 28, the "points open" pulse from detecting means 44 and the "end of spark pulse" from detecting means 38.

The outputs from the aforesaid test apparatus are applied to and stored in storage means 67. Storage means 67 may be the memory portion of a computer so that the data obtained from the test apparatus can be compared with specifications prestored in storage means 67. If data relating to the output of the engine ignition coil is desired, the disconnected end of coil winding 16 may also be connected as an input to storage means 67. A more detailed explanation of the test apparatus now follows.

POINTS OPEN DETECTING MEANS

The points open detecting means 44 circuit is connected across the breaker points 20 of the ignition system and, therefore, the input signal to the points open detector circuit will be the primary circuit voltage waveform as shown in FIG. 1. Referring to FIG. 1, the time at which the points open is manifested in the primary voltage waveform by an abrupt voltage increase which occurs after the voltage has been at a relatively low level for a period of time (i.e., the dwell zone). Thus, the points open detecting means 44 is designed to produce an indication that the points have opened when the voltage across the points has remained below a threshold voltage for a period of time $\Delta t$ and then exceeds for the first time the voltage threshold.

Referring to FIG. 3, the voltage across the breaker points 20 is applied as an input voltage signal to voltage comparator 46, a conventional threshold circuit which provides an output signal on lead 52 when the voltage across the breaker points is equal to or below the threshold voltage which has been selected as 3 volts. When the voltage across the breaker points is greater than the threshold voltage of 3 volts, the comparator 46 produces an output signal on lead 54 and no output signal on lead 52.

Lead 54 is connected to a timing circuit 48. A signal on lead 54 will reset the timing circuit. When the signal on lead 54 ceases, the timing circuit will commence to count for a period $\Delta t$ selected to be 1.5 milliseconds. During the counting period of 1.5 milliseconds, there is no output signal on the lead 58 from timing circuit 56. Only at the end of the counting period of $\Delta t$ does an output signal appear on lead 58. Lead 52 from voltage comparator 46 which will have an output signal thereon when the voltage across the breaker points is below 3 volts is connected to an AND circuit 50 along with lead 58 from timing circuit 56.

AND circuit 50 can be gated only when the voltage across the breaker points 20 has been below the threshold level of 3 volts for 1.5 milliseconds which, referring to FIG. 1, means that AND circuit 50 is gated during later part of the dwell zone. When the points open, the voltage across the points exceeds the threshold level and the output signal on lead 52 ceases and timing circuit 56 is reset thereby disabling AND circuit 50. Thus, the time at which AND circuit 50 is disabled is the precise time at which the breaker points have opened.

The operation of the points open detector circuit 44 can be better understood by reference to FIG. 1. Presuming that the points have opened and the voltage waveform is within the spark zone period, the voltage will be above the 3 volt threshold level and there will be a signal on lead 54 and no signal on lead 52. When the voltage goes below the threshold level, for example, at the end of the spark zone, timing circuit 56 will begin to count. However, before 1.5 milliseconds has elapsed, the voltage has again gone above the threshold level and timing circuit 56 is reset. Thus, AND circuit 50 was not gated because, although there was a signal on lead 52 for a short duration of time, there was no signal on lead 58 from the timing circuit. When the points close, the voltage goes below the threshold level and a signal appears on lead 52. Also, timing circuit 56 begins to count. At the end of 1.5 milliseconds (at a time within the dwell period), the timing circuit 56 produces an output signal on lead 58 and AND circuit 50 is gated and produces an output signal on lead 60. When the points open the input voltage to comparator 46 exceeds 3 volts, the signal on lead 52 will cease and the timing circuit will be reset by a signal on lead 54 because the voltage has exceeded the threshold value and AND circuit 50 will be disabled. The output signal from AND circuit 50 on lead 60 is a square wave pulse having a trailing edge which occurs coincident in time with the opening of the points. The signal on lead 60 is applied to a differentiating circuit 62 which converts the square wave output into a positive voltage spike for the leading edge of the square wave and a negative voltage spike for the trailing edge of the waveform. The output signal from differentiating circuit 62 is applied to a clipping circuit 64 which clips the positive spike voltage leaving the negative spike pulse produced by the trailing edge of the output from AND circuit 50 which was caused by the opening of the breaker points. The output pulse from clipping circuit 64 is therefore representative of the opening of the breaker points. The output pulse from clipping circuit 64 is applied to storage means 67 along with the clock pulses from clock 65 to establish the relative time the points open. It should be obvious to one skilled in the art that voltage comparator 46 is a conventional threshold device and timing circuit 56 is a conventional counter and that AND circuit 50 is a well-known logic device and, therefore, specific details of the circuits employed in these devices will not be described.

EXTERNAL PULSE GENERATOR

The external pulse generator 28 consists of the pulse control means 30, pulse driver 32 and a coil including primary winding 34 and secondary winding 36. The function of the external pulse generator is to produce an idealized ignition pulse such that the secondary voltage waveform across secondary winding 36 resembles the waveform of FIG. 2 or any other waveform more suitable for analysis.

In its principal mode of operation, the external pulse generator 28 provides an output voltage waveform from secondary winding 36 to the distributor 22 to provide a spark voltage for each of the spark plugs associated with the eight cylinders of the engine. At the time when the breaker points open, the external pulse generator 28 is therefore actuated by the points open signal from the points open detector 44. In certain test modes, it may be desired to advance or delay the time of occurrence of the pulse or to ignite only selected ones of the eight spark plugs in order that only selected cylinders are operated. Pulse control means 30, which is connected to the output of the points open detection means, is provided to effect these functions.

Figure 4:
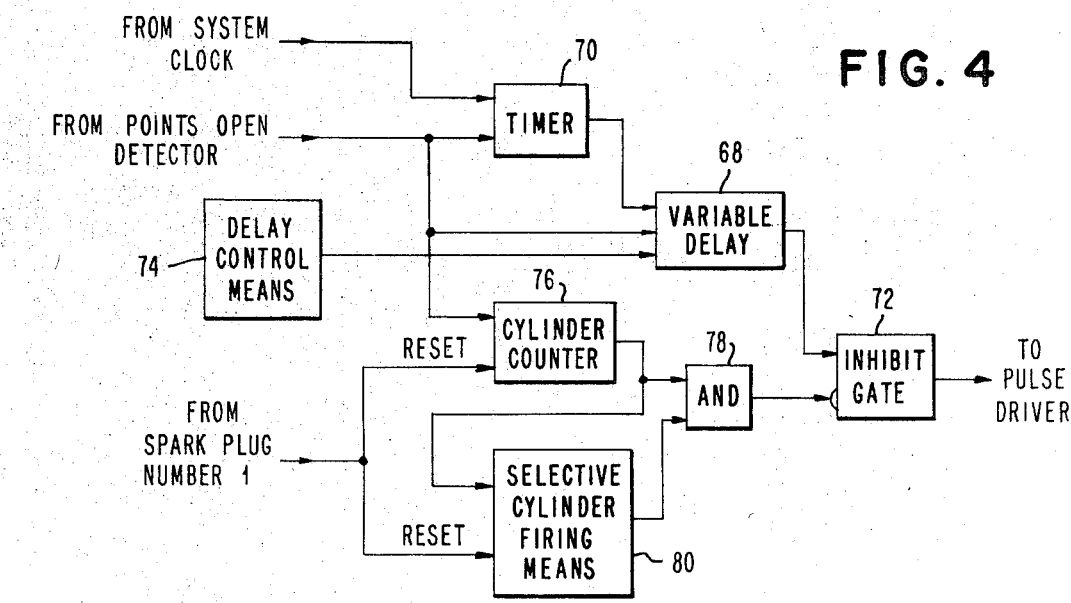
FIG. 4 is a detailed diagram of the pulse control means of FIG. 3.

Referring to FIG. 4, a detailed block diagram of pulse control means 30 is shown. In FIG. 4, a variable delay means 68 is connected to the points open signal from points open detector 44 and also to the output of timer 70. Timer 70 counts the interval between successive points open signals and is reset by each points open signal from detector 44. The variable delay means 68 normally provides a delay equal to the output of the timer and therefore equal to the time interval between the points open signal. Normally, the variable delay means 68 produces an output signal in synchronism with the occurrence of the points open signal since the output of the timer is equal to the duration of time between the points open signals. Normally, the output signal from the variable delay means 68 is applied through an open inhibit gate 72 to actuate the pulser driver to cause a pulse to be generated in synchronism with the points open signal.

More particularly, the variable delay means 68 includes digital counting means. At the time of the point open signal, timer 70 is reset and its contents are loaded into the counting means of the variable delay means 68 and the counting means count down in synchronism with the timer 70. When the value of variable delay counting means reaches zero, an output pulse is produced. Thus, in normal operation, an output pulse is produced from variable delay means 68 in synchronism with the points open signal.

Variable delay means 68 may be controlled, however, by delay control means 74. Delay control means 74 is adjusted to suppress one or more counts in the counter of variable delay means 68 when a timing retardation is desired or to double one or more counting pulses in the variable delay means 68 if timing advance is desired. Delay control means 74 may be a counter control device which is controlled by an operator or may represent a control portion of a computer. The output of variable delay means is coupled through normally open inhibit gate 72 which provides an input signal to the pulse driver 32 (FIG. 3).

The points open signal from points open detector 44 is also connected to a cylinder counter 76 which increments each time the points open and contains a total count equal to the number of engine cylinders, which in the present example is eight. Cylinder counter 76 is reset by a pulse tapped off the first spark plug. Cylinder counter 76 produces an output signal indicative of which cylinder is being fired. The output of the cylinder counter is connected directly to an AND gate 78 and also to a selective cylinder firing means 80.

Selective cylinder firing means 80 is also a counter which is preset to produce pulses in a selective firing pattern. Selective cylinder firing means 80 is reset by the signal from the first spark plug and is incremented by the output of the cylinder counter. However, selective cylinder firing means 80 does not produce an output for every output pulse from the cylinder counter but is preset or adjusted by the operator to produce an output pulse only for selected counts. Thus, if every other cylinder is to be analyzed, selective cylinder firing means 80 may produce an output pulse for the first, third, fifth and seventh count pulses from cylinder counter 76. The output of selective cylinder firing means 80 is also connected to AND circuit 78. Thus, AND circuit 78 will be gated and produce an output signal only at the times when the first, third, fifth and seventh cylinders are to be fired.

The output signal from AND circuit 78 is connected to inhibit gate 72 to inhibit the output from variable delay means. Thus, a signal will be applied to the pulse driver 32 only at the times when the second, fourth, sixth and eighth cylinders are to be fired. Selective cylinder firing means 80 can be adjusted to inhibit the firing of any one or combinations of cylinders. The output of inhibit gate 72, therefore, produces an output pulse upon the occurrence of the points open signal from points open detector means 44. The time of occurrence of this pulse, however, can be advanced or retarded by the variable delay means 68 or can be inhibited entirely by the selective cylinder firing means 80. The output pulse from inhibit gate 72 is a negative going pulse and is applied to pulse driver 32.

Figure 5:
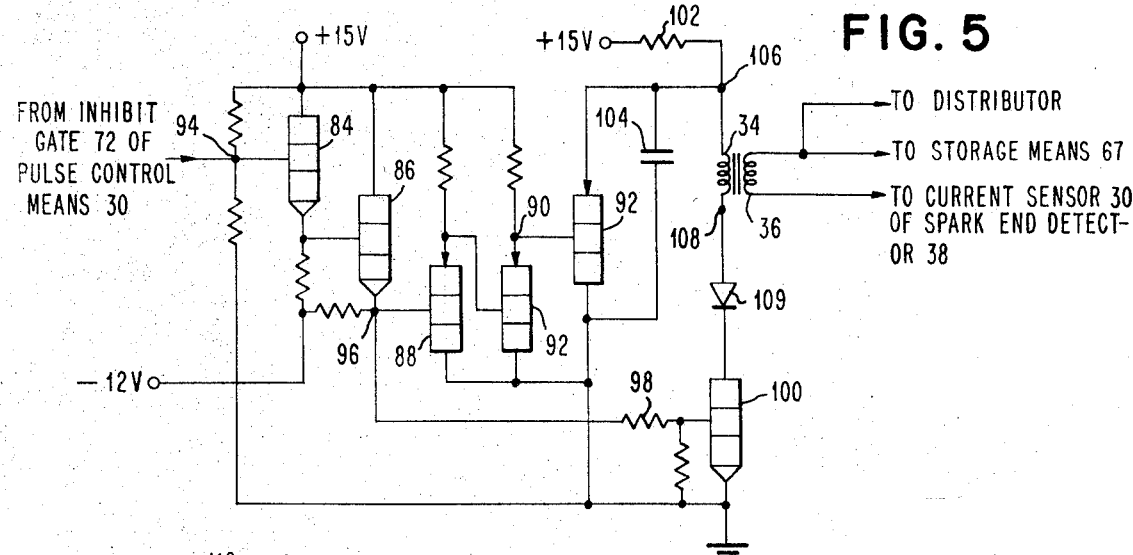
FIG. 5 is a detailed diagram of the pulse driver means of FIG. 3.

Pulse driver 32 receives the output pulse from inhibit gate 72 of pulse control means 30 and applies a voltage across primary coil winding 34. Referring to FIG. 5, a more detailed schematic circuit of pulse driver 32 is shown. Referring ot FIG. 5, the negative going pulse from inhibit gate 72 of pulse control means 30 is connected to the base of a NPN transistor 84. Transistor 84, NPN transistor 86 and PNP transistor 88 are emitter-follower configurations which operate in a conventional manner to isolate the input and to provide a signal at point 90 at the base of PNP transistor 92, which is always approximately the same value as the input voltage neglecting the emitter-base voltage drops. The voltage at the input terminal 94 in the absence of any input signal is approximately equal to the positive 15 volt supply voltage. The voltage at input terminal 94, when an input signal is present, is approximately ground.

In the absence of an input signal at input terminal 94, the potential at point 96 is also approximately equal to the supply voltage and a current of about 1 ampere flows through resistor 98 into the base of transistor 100, thereby causing transistor 100 to conduct. Because of the inductance of the coil formed by windings 34 and 36, the current through the resistor 102, the primary windings, 34, diode 109 and transistor 100 starts flowing only gradually and reaches its peak and final value of around 8 amperes about 3 milliseconds after transistor 100 is turned on. The resistance of the primary winding of the coil is only about 0.2 ohm. The voltage at point 106 between resistor 102 and coil 34 adjusts to about 3 volts. This is also the voltage at the emitter of transistor 92. Since the potential at the base of transistor 92 is more positive than 3 volts, transistor 92 is off.

When a negative input voltage pulse is applied to input terminal 94, the potential at the input terminal is pulled down and consequently the potential at point 96 is also pulled down. Thus, the voltage applied to the base of transistor 100 is reduced and transistor 100 becomes nonconducting. When transistor 100 becomes nonconducting, this tends to halt the flow of current in the primary winding 34. However, the current in winding 34 continues to flow for a short time while charging up the transformer capacitances and seeking an outlet in the secondary winding 36, which generates a high voltage because of the rapidly decaying magnetic field associated with the magnetizing current.

Transistor 92 and capacitor 104 have little effect on the coil output during firing time. However, their function is to prevent an excessive coil output when transistor 100 is turned on again, which could produce misfiring of the engine. If transistor 92 and capacitor 104 were not in the circuit, the voltage at point 106 would rise exponentially to the supply voltage +15 volts as the primary winding current is reduced to zero. However, with the base of transistor 92 held to approximately ground potential, the voltage at point 106 cannot rise much above ground potential.

Just prior to the turning on of transistor 100, the voltage across primary winding 34 is zero. If point 108 is suddenly connected to ground, the voltage between point 106 and ground, multiplied by the turns ratio, appears across the secondary winding. Thus, when transistor 100 is turned on and transistor 92 is turned off, the initial voltage is low and the voltage applied across the primary winding 34 increases only gradually because of capacitor 104. Thus, the ratio of the change of voltage with respect to time across the coil is kept low and the output voltage from the secondary winding remains below a critical value sufficient to fire the spark plugs at the wrong time.

The output pulses produced from the secondary winding 36 are applied to the distributor to fire the spark plugs at the desired times, and is also applied to storage means 67 so that the firing voltage, the spark voltage and other parameters of interest can be stored.

The ground return path of secondary winding 36 is connected through the current sensor 40 of a spark end detecting means 38 to ground potential.

SPARK END DETECTING MEANS

Figure 6:
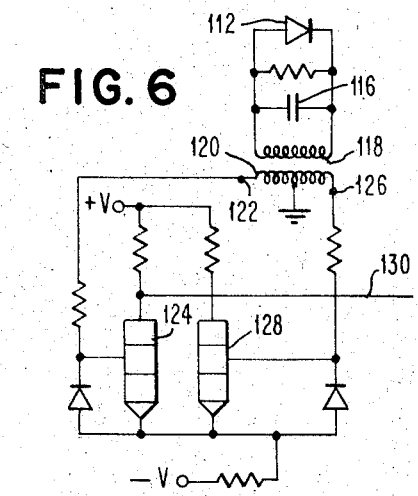
FIG. 6 is a detailed diagram of the end of spark detecting means of FIG. 3.

Referring to FIG. 6, a more detailed schematic illustration of spark end detecting means 38 is shown. The function of the spark end detector 38 is to detect automatically the spark end point in an ignition waveform. The spark end point may be determined from the secondary voltage waveform of FIG. 2. However, determining the spark end point by using the secondary voltage waveform is difficult to do inexpensively with the desired precision and reliability, especially in the presence of fault conditions or noise. It is more desirable to determine the spark end point from the current in the ground return path of the ignition coil secondary winding. In the actual automotive ignition system, the ground return path of the secondary winding is inaccessible. However, due to the fact that in the present invention an external pulse generator 28 is employed, having an accessible ground return path in the secondary coil winding, it is possible to employ a spark end detector in the ground return path of the secondary coil winding.

Figure 7:
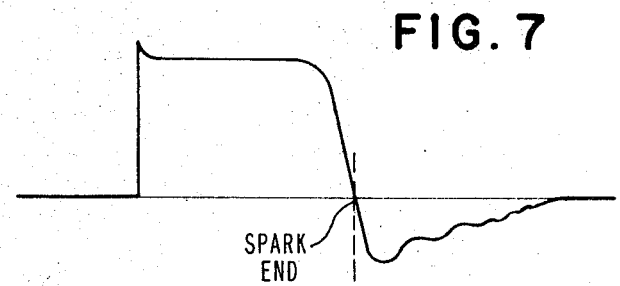
FIG. 7 is a curve representing a voltage waveform useful in explaining the operation of the end of spark detecting means of FIG. 6.

Referring to FIG. 6, the current sensor 40 of FIG. 3 is shown as consisting of a rectifier 112, a resistor 114 and a capacitor 116 connected in parallel. The rectifier 112 clips the voltage waveform of the ignition coil ground return path and resistor 114 and capacitor 116 in parallel operate as a filter which shapes the clipped waveform. The resultant waveform is shown in FIG. 7. In FIG. 7, it can be seen that the end of spark point is the point at which the waveform passes through the zero axis. Thus, the output of current sensor is applied to a zero crossing detector. In FIG. 6, a zero crossing detector is shown which compensates for any common mode noise. The signal is applied across the primary winding 118 of a transformer having a center tapped secondary winding 120. One end 122 of the center tapped secondary winding 120 is connected to NPN transistor 124 and the other side 126 of the center tapped secondary winding 120 is connected to NPN transistor 128.

Preceding the end of spark, the voltage at end 122 of the center tapped transformer secondary winding 120 is positive with respect to ground and the potential at end 126 of the center tapped transformer secondary winding 120 is negative with respect to ground potential. Thus, the NPN transistor 124 conducts and transistor 128 is non-conducting. At the time when the waveform of FIG. 7 crosses the zero axis, the relative polarity across the transformer secondary winding 120 changes and the transistor 124 cuts off, however, transistor 128 begins to conduct. The output lead 130 is connected to the collector of transistor 124. Thus, the output signal on lead 130 will change to the up level at the precise time when the spark end occurs. Alternatively, lead 130 may be connected to the collector of transistor 128 so that the signal on lead 130 changes to the down level at the time when the spark end occurs.

What has been described is a system of test apparatus for obtaining data relating to the performance of the ignition system of an internal combustion engine. An external pulse generator is provided to produce a well-defined pulse which emulates the pulse usually obtained from the secondary of the engine ignition coil. A spark end detection means is provided to indicate the time of occurrence of the end of the spark discharge and a points open detection means is provided to indicate the time when the engine breaker points open. Examples of specific circuits for carrying out the functions have been shown in FIGS. 4, 5 and 6, however, these specific circuits are provided for purposes of explanation and one skilled in the art should appreciate that a number of different embodiments could be employed to carry out the desired function and still be within the scope of the present invention.

Therefore, while the invention has been particularly shown and described with reference to a preferred embodiment thereof, it will be understood by those skilled in the art that the foregoing and other changes in form and details may be made therein without departing from the spirit and scope of the invention.

What is claimed is:

1. In an internal combustion engine ignition system having a battery, an ignition coil, a condenser, breaker points, a distributor and spark plugs, and wherein the secondary winding of the ignition coil is disconnected from the distributer, test apparatus comprising:
   first detection means connected to said breaker points for producing an output signal at the time said breaker points open;
   pulse generating means connected to output of said first detection means and connected to said distributor for producing output voltage pulses in response to said output signals from said first detection means, said output voltage pulses being conducted through said distributor to produce a spark discharge across said spark plugs; and
   second detection means connected to the output of said pulse generating means and responsive to said output voltage pulses therefrom for producing an output signal at the time when said spark discharge ends,
   a clock means for producing timing signals,
   and a storage means connected to said clock means, to said first detection means, and to said second detection means for storing said timing signals, said output signals from said first detection means and said output voltage pulses from said second detection means for establishing the times of occurrence of the opening of said breaker points and said end of spark discharge relative to said timing signals.

2. In an internal combustion engine ignition system having a battery, an ignition coil, a condenser, breaker points a distributor and spark plugs, and wherein the secondary winding of the ignition coil is disconnected from the distributor, test apparatus comprising:
   first detection means connected to said breaker points for producing an output signal at the time said breaker points open;
   pulse generating means connected to output of said first detection means and connected to said distributor for producing output voltage pulses in response to said output signals from said first detection means, said output voltage pulses being conducted through said distributor to produce a spark discharge across said spark plugs; and
   second detection means connected to the output of said pulse generating means and responsive to said output voltage pulses therefrom for producing an output signal at the time when said spark discharge ends,
   a clock means for producing timing signals,
   and a storage means connected to the output of said clock means, to the output of said first detection means and to the output of said pulse generation means for storing said timing signals, said output signals from said first detection means and said output voltage pulses from said second detection means for establishing the times of occurrence of said breaker points open signal and said end of spark signal relative to said timing signals and for storing the amplitude of said voltage pulse and selected times.

3. In an internal combustion engine ignition system having a battery, an ignition coil, a condenser, breaker points, a distributor and spark plugs, and wherein the secondary winding of the ignition coil is disconnected from the distributor, test apparatus comprising:
   first detection means connected to said breaker points for producing an output signal at the time said breaker points open;
   pulse generating means connected to output of said first detection means and connected to said distributor for producing output voltage pulses in response to said output signals from said first detection means, said output voltage pulses being conducted through said distributor to produce a spark discharge across said spark plugs; and
   second detection means connected to the output of said pulse generating means and responsive to said output voltage pulses therefrom for producing an output signal at the time when said spark discharge ends, wherein said first detection means includes threshold means connected to said breaker points and responsive to changes in voltage levels across said breaker points for producing a first output signal when the voltage across said points exceeds a selected threshold value as a result of said points opening and a second output signal when said voltage across said points is equal to or below said selected threshold value,
   timing means connected to said threshold means and responsive to and being reset by said first signal therefrom for producing a continuous output signal which begins a preset period after the initiation of said first signal,
   and an AND circuit connected to said threshold means and said timing means and responsive to said second output signal from said threshold means and said output signal from said timing means to produce an output signal when said second output signal and said timing means output signal are simultaneously present said AND circuit output signal occurring when said voltage across said breaker points is below said selected threshold value for a preset time.

4. Apparatus for detecting when the breaker points on an engine ignition system open comprising:
   threshold means connected to said breaker points and responsive to changes in voltage levels across said breaker points for producing a first output signal when the voltage across said points exceeds a selected threshold value as a result of said points opening and a second output signal when said voltage across said points is equal to or below said selected threshold value, timing means connected to said threshold means and responsive to and being reset by said first signal therefrom for producing a continuous output signal which begins a preset period after the initiation of said first signal;

and an AND circuit connected to said threshold means and said timing means and responsive to said second output signal from said threshold means and said output signal from said timing means to produce an output signal when said second output signal and said timing means output signal are simultaneously present, said AND circuit output signal occurring when said voltage across said breaker points is below said selected threshold value on a preset time.

References Cited
UNITED STATES PATENTS

| | | | |
|---|---|---|---|
| 3,286,164 | 11/1964 | De Huff | 324—16 |
| 3,364,418 | 1/1968 | MacCrea | 324—16 |
| 3,454,871 | 7/1969 | Nolting | 324—16 |
| 3,404,333 | 10/1968 | Roberts | 324—15 |

RUDOLPH V. ROLINEC, Primary Examiner

M. J. LYNCH, Assistant Examiner

U.S. Cl. X.R.

73—116